Feb. 6, 1968 F. F. GRANT 3,367,593
TAPE DRIVE MECHANISM
Filed May 5, 1966
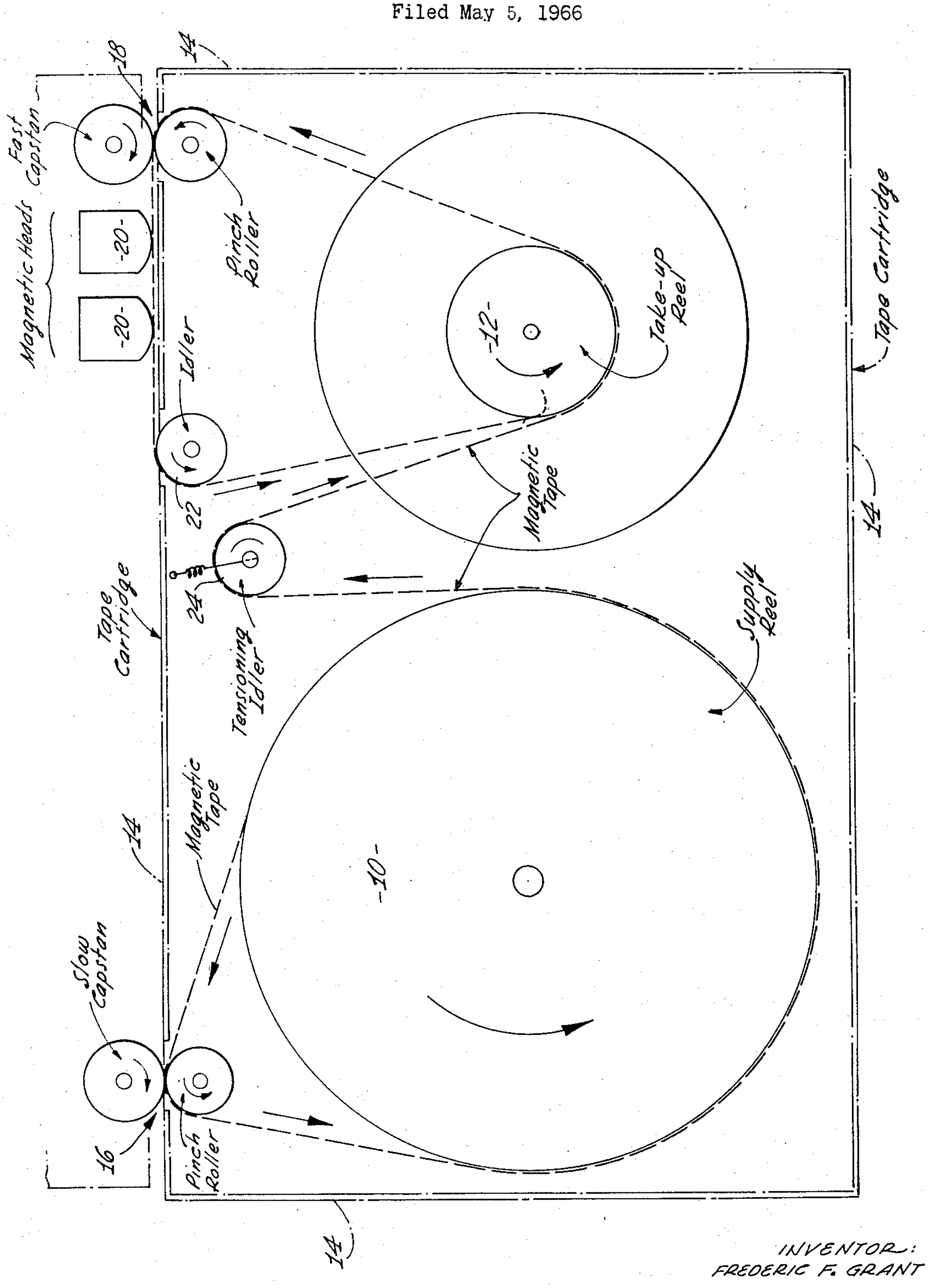
INVENTOR:
FREDERIC F. GRANT
By Warren T. Jessup
ATTORNEY United States Patent Office 3,367,593

Patented Feb. 6, 1968

3,367,593

TAPE DRIVE MECHANISM

Frederic F. Grant, Bellflower, Calif., assignor, by mesne assignments, to Astro-Science Corporation, South El Monte, Calif., a corporation of Texas Filed May 5, 1966, Ser. No. 547,906
5 Claims. (Cl. 242—55.13)

ABSTRACT OF THE DISCLOSURE

A tape drive mechanism is described in the ensuing specification, in which a tape is driven by a capstan from a supply reel to a take-up reel; the tape itself being used to drive the supply reel and take-up reel so that there is no need for separate drive mechanisms for these reels.

The present invention relates to tape drive mechanisms for magnetic recorders, or the like; and it relates more particularly to an improved, simple tape drive mechanism which finds particular utility, for example, in small cartridge-type recorders.

It will become evident as the description proceed, that the concepts of the present invention can be used in any type of recorders, including the more expensive instrumentation-type in which speed and tape tension must be precisely maintained at a constant value.

Transporting the magnetic tape from the supply reel in a tape recorder to the take-up reel at essentially constant velocity and tension is a prime requirement of any tape recorder.

It is usual in most tape recorders, to provide one or more capstans in the tape drive mechanism, and these capstans are used to draw the tape from the supply reel across the magnetic heads and to the take-up reel. Additional motors and servo mechanisms are usually provided, especially in the more expensive type of equipment, to drive the reels and to control their speed.

However, tape drive mechanisms which include separate motors and servo systems for the reels themselves are, in addition to being unduly expensive, relatively large and bulky in size. This type of drive system, therefore, is not readily susceptible to being packaged into the smaller cartridge-type of machine.

The tape drive mechanism of the present invention is advantageous in that it permits the tape to be transported across the magnetic heads at the desired constant speed and tension. This is achieved, as will be described, by the provision of a capstan drive mechanism. The capstan drive mechanism of the invention engages the tape and not only draws the tape at constant speed and tension across the magnetic heads of the instrument, but also serves to cause the tape itself to function as a drive means for the reels.

This drive means is such that the take-up reel tends to be driven at a slightly faster rate than the supply reel, so that the tape is maintained under tension at all times throughout the entire system.

A feature of the tape drive mechanism of the present invention is that a full and precise control of the tape and reels is achieved without the need for separate motors or servo systems for the reels themselves.

Another feature of the tape drive mechanism of the invention is that it can be packaged in a relatively small volume and can conveniently be housed in a removable cartridge for use in conjunction with the cartridge-type of recorder.

An object of the present invention, therefore, is to provide a precise and accurate tape drive system for a magnetic recorder, or the like, which is relatively simple and inexpensive in its construction, and yet which functions to drive the tape at the desired constant speed and tension across the magnetic heads of the machine regardless of the amount of tape which happens to be on the take-up or supply reel at any time during the operation.

The embodiment of the tape drive mechanism of the invention to be described includes a supply reel, a take-up reel, and a pair of drive capstans. The tape from the supply reel is looped through the drive capstans in a manner such that the drive capstans draw the tape from the supply reel to the take-up reel, with the tape being disposed on each of the reels in successive "wrapping" layers and as a circumscribing "driving" layer, so that as the capstans draw the tape from the supply reel to the take-up reel, the reels themselves are actually driven at the desired speeds, and the tape is drawn at constant speed and tension across the magnetic heads of the apparatus.

Other objects and advantages of the invention will become apparent from a consideration of the following specification, when the specification is taken in conjunction with the accompanying drawing, in which the single figure is a schematic representation of a tape drive mechanism constructed in accordance with the concepts of the present invention.

As shown in the drawing, the tape drive mechanism of the invention includes a supply reel 10 and a take-up reel 12. These reels, for example, are rotatably mounted in a housing 14 which may, for example, be a removable tape cartridge-type of housing.

The composition of the reels 10 and 12 is well known, and it is believed that there is no need to encumber the present record with the mechanical details of the reels, or of the other individually known components of the system which will be described.

The mechanism also includes a first capstan drive 16 and a second capstan drive 18. These capstan drives are of the usual type, and each includes, for example, a capstan which is rotatably driven, and an idler pinch roller which is pressed against the corresponding capstan when the cartridge 14 is moved into place in the recorder apparatus. As is well known, the magnetic tape is sandwiched between the capstan and associated pinch roller, in each instance, so that as the capstan is rotatably driven, the tape is moved along its path.

The capstan drive 18 is driven at a somewhat faster speed than the capstan drive 16, so as to maintain a desired tension of the tape throughout its travel from the supply reel 10 to the take-up reel 12. The capstans and pinch rollers may have rubber rims, as is well known to the art.

The magnetic recorder includes the usual magnetic heads, designated 20 in the drawing, and an idler 22 is rotatably mounted in the housing 14 in the position shown. It will be appreciated that the capstan drive 18 and the idler 22 are in essential axial alignment on opposite sides of the magnetic heads 20, and that the capstan drive 16 is in essentially axial alignment with the idler 22 and the capstan drive 18, as shown.

It will also be appreciated that when the cartridge 14 is moved into place, not only is the magnetic tape pinched between the rollers and capstans of the capstan drives 16 and 18, but it is also drawn against the sensitive face of each of the magnetic heads 20 by the action of the idler 22.

A further idler 24 is mounted in the housing 14. The idler 24 is a spring-loaded tensioning type of idler, and it serves to maintain the magnetic tape under tension, as it is unloaded from the supply reel 10 and onto the take-up reel 12.

As shown the drawing, the magnetic tape is threaded from the supply reel 10 around the pinch roller of the drive capstan 16 and back around the supply reel as a "driving" layer, the driving layer engaging the underneath layer (which is referred to herein as the "wrapping" layer) partially around the periphery of the supply reel.

The magnetic tape then passes around the tensioning idler 24 and around the take-up reel 12 to the pinch roller of the drive capstan 18. The tape then passes across the magnetic heads and around the idler 22 back to the take-up reel and under the "driving" layer formed by the tape as it passes around the take-up reel between the tensioning idler 24 and the pinch roller of the drive capstan 18. Again, the outer layer of the tape on the take-up reel will be referred to herein as the "driving" layer, and the underneath layer from the idler 22 will be referred to as the "wrapping" layer.

It will be appreciated that the tensioning idler 24 maintains the "driving" layers of the tape on both the supply reel 10 and take-up reel 12 in firm engagement with the adjacent "wrapping" layers, so that the capstans 16 and 18, as they draw the tape around the system, cause the "driving" layers to rotate and drive the respective reels 10 and 12. As mentioned above, the capstan drive 18 is rotated slightly faster than the capstan drive 16, so that the tape is maintained in tension throughout the entire system.

Also, since the "driving" layer of tape on the supply reel 10 is driven directly by the capstan drive 16, whereas the "driving" layer on the take-up reel 12 is driven directly by the capstan drive 18, and since the capstan drive 18 is rotating slightly faster than the capstan drive 16, the take-up reel 12 tends to be rotated slightly faster than the supply reel 10, so that the desired tension of the tape throughout the system is maintained, and all slackening of the tape is avoided.

It will be appreciated that the tape drive system illustrated in the drawing may also be used for rewind purposes, merely by reversing the direction of rotation of the capstan drives 16 and 18 and causing the capstan drive 16 to be driven at a slightly higher reverse speed than the capstan drive 18.

The invention provides, therefore, an improved and simplified tape transport mechanism which is precise and accurate in its operation, and yet which requires but a minimum of drive components. As described, the mechanism and system of the invention is particularly useful in the cartridge-type of tape recorders.

While a particular embodiment has been described, modifications may be made. It is intended in the claims to cover all modifications which fall within the scope of the invention.

What is claimed is:

1. A tape drive mechanism including:
a housing;
a supply reel rotatably mounted in said housing for holding a supply of an elongated flexible tape-like member;
a take-up reel rotatably mounted in said housing for receiving the tape-like member from the supply reel and spaced from the supply reel;
a first drive capstan for drawing the tape-like member from a wrapping layer on the supply reel and returning the tape-like member to the supply reel as a driving layer over said wrapping layer;
said tape-like member passing to said take-up reel as a driving layer; and
a second drive capstan for drawing the tape-like member from said driving layer on the take-up reel and returning the tape-like member to the take-up reel as a wrapping layer under said last-named driving layer.

2. The tape drive mechanism defined in claim 1 in which said second drive capstan is driven at a higher speed than said first drive capstan.

3. The drive mechanism defined in claim 1 in which guiding means including an idler roller is mounted in said housing.

4. The tape drive mechanism defined in claim 1 and which includes a tensioning idler roller rotatably mounted in said housing between said supply reel and said take-up reel so as to maintain a frictional drive engagement between the aforesaid driving layers on said supply and take-up reels and respective ones of said wrapping layers thereon.

5. The tape drive mechanism defined in claim 1 in which said housing is a removable tape cartridge.

References Cited

UNITED STATES PATENTS

| | | | |
|---|---|---|---|
| 1,317,404 | 9/1919 | Thomas | 242—55.14 |
| 2,592,158 | 4/1952 | Kirby et al. | 242—71.2 |
| 3,207,399 | 9/1965 | Dekker | 242—55.12 X |

GEORGE F. MAUTZ, *Primary Examiner.*